Figure 1:
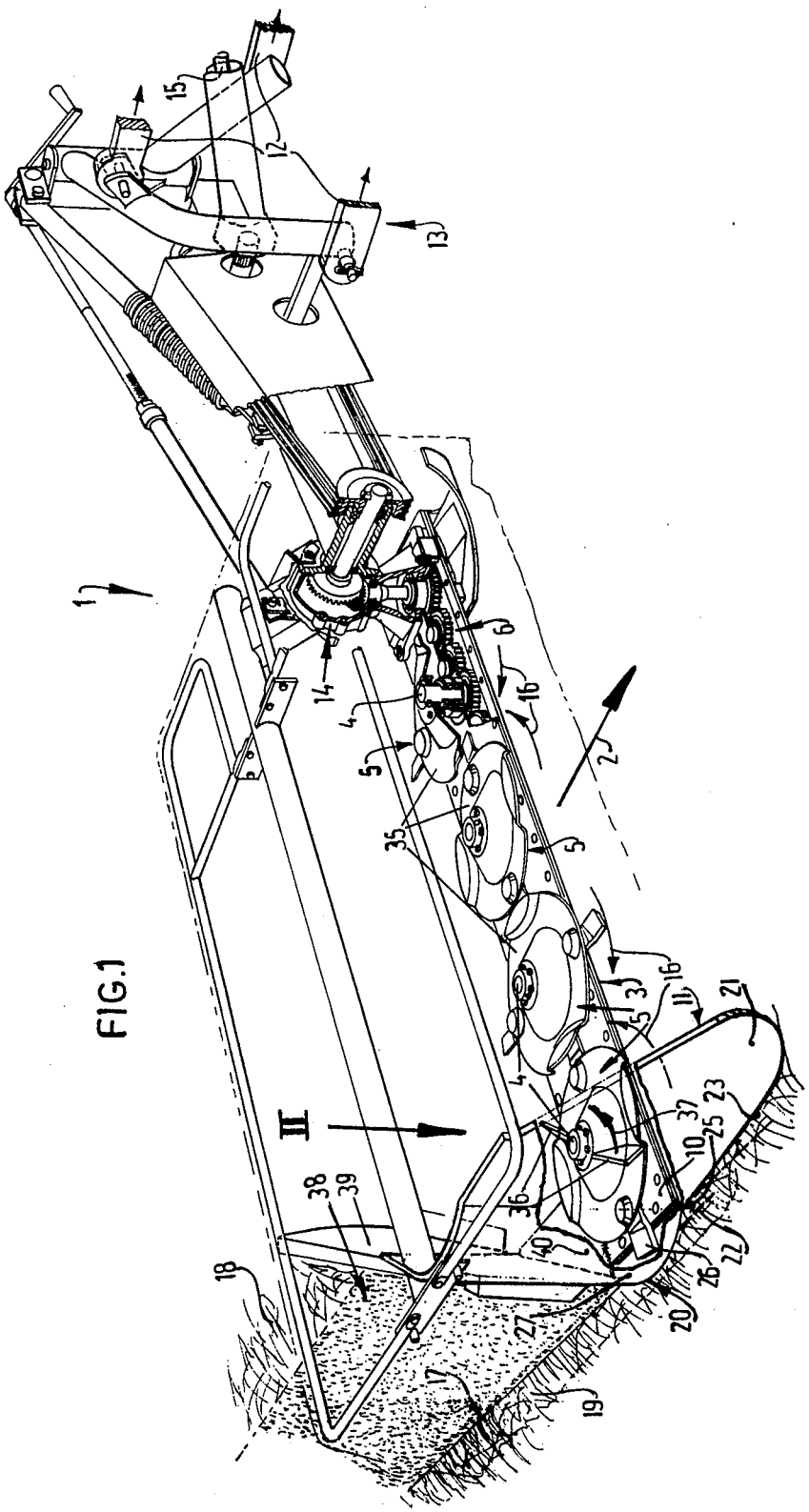

United States Patent [19]

Oosterling et al.

[11] 4,099,369
[45] Jul. 11, 1978

[54] MOWING DEVICE

[75] Inventors: Pieter Adriaan Oosterling; Hendricus Cornelis van Staveren, both of Nieuw-Vennep, Netherlands

[73] Assignee: Multinorm, B.V., Nieuw-Vennep, Netherlands

[21] Appl. No.: 729,827

[22] Filed: Oct. 5, 1976

[30] Foreign Application Priority Data

Oct. 10, 1975 [NL] Netherlands ............ 7511970

[51] Int. Cl.$^2$ ............................................. A01D 63/00
[52] U.S. Cl. ........................................ 56/314; 56/295
[58] Field of Search ............... 56/295, 192, 13.5, 13.6, 56/314

[56] References Cited

U.S. PATENT DOCUMENTS

| 551,236 | 12/1895 | Smith | 56/295 |
| 604,189 | 5/1898 | Davis | 56/295 |
| 2,632,991 | 3/1953 | Schwartz | 56/314 |
| 3,043,081 | 7/1962 | Sandall | 56/314 |

*Primary Examiner*—Russell R. Kinsey
*Attorney, Agent, or Firm*—Snyder, Brown & Ramik

[57] ABSTRACT

A mowing device having rotating cutting members above a transverse housing comprises a screen arranged near one end of said housing and having a front portion disposed in front of the outermost cutting member, viewed in the direction of travel, and being located just inside the outermost path of said cutting member but at a higher level than said cutting member. In order to provide a distinct separation between mown crop and the crop still to be cut the lower rim of the screen near the outermost cutting member is disposed further outwardly than the front portion and outside the outermost cutting member, the lower rim of the screen being located at a higher level than the supporting surface, that is to say, approximately at the cutting level of the outermost cutting member.

26 Claims, 9 Drawing Figures

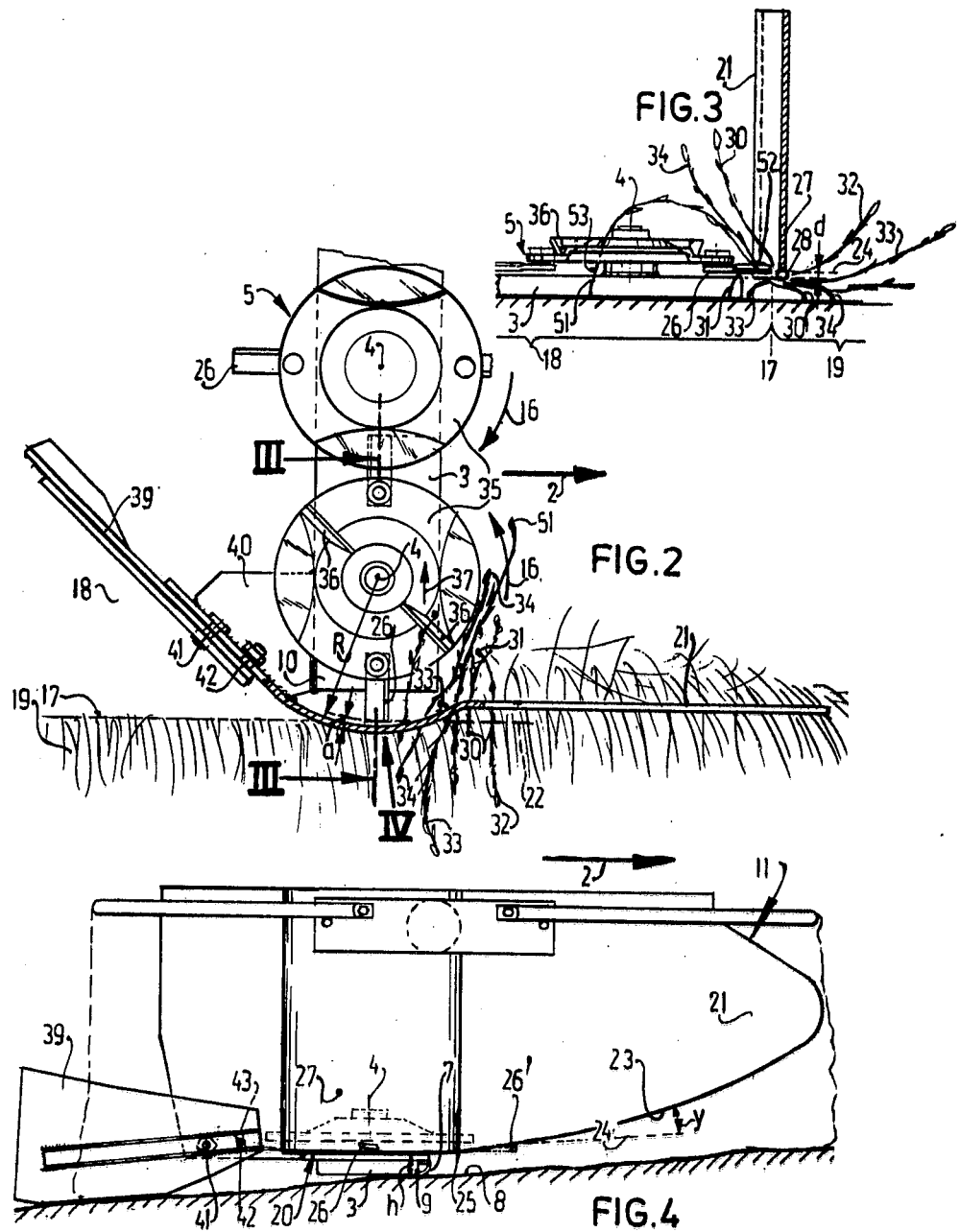

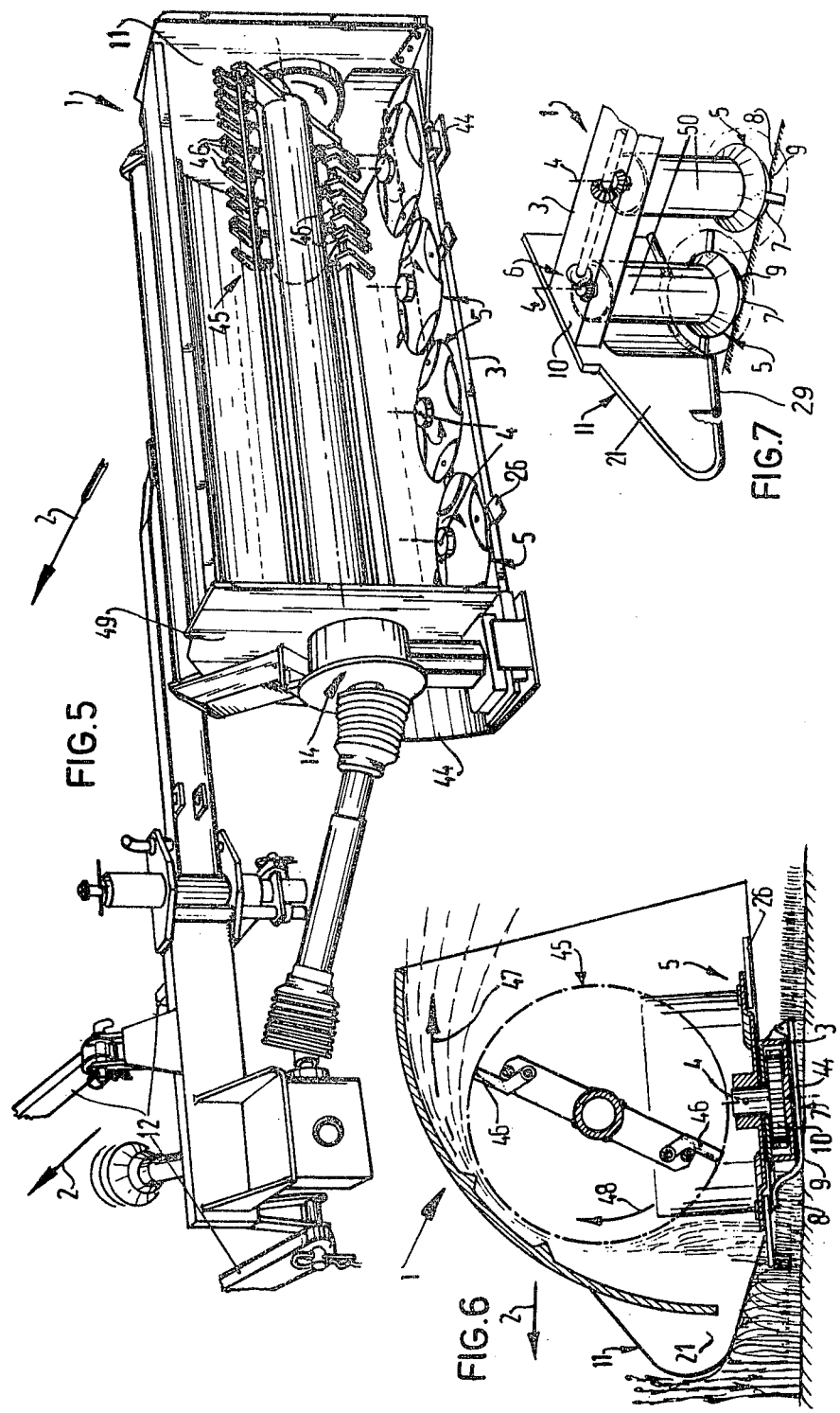

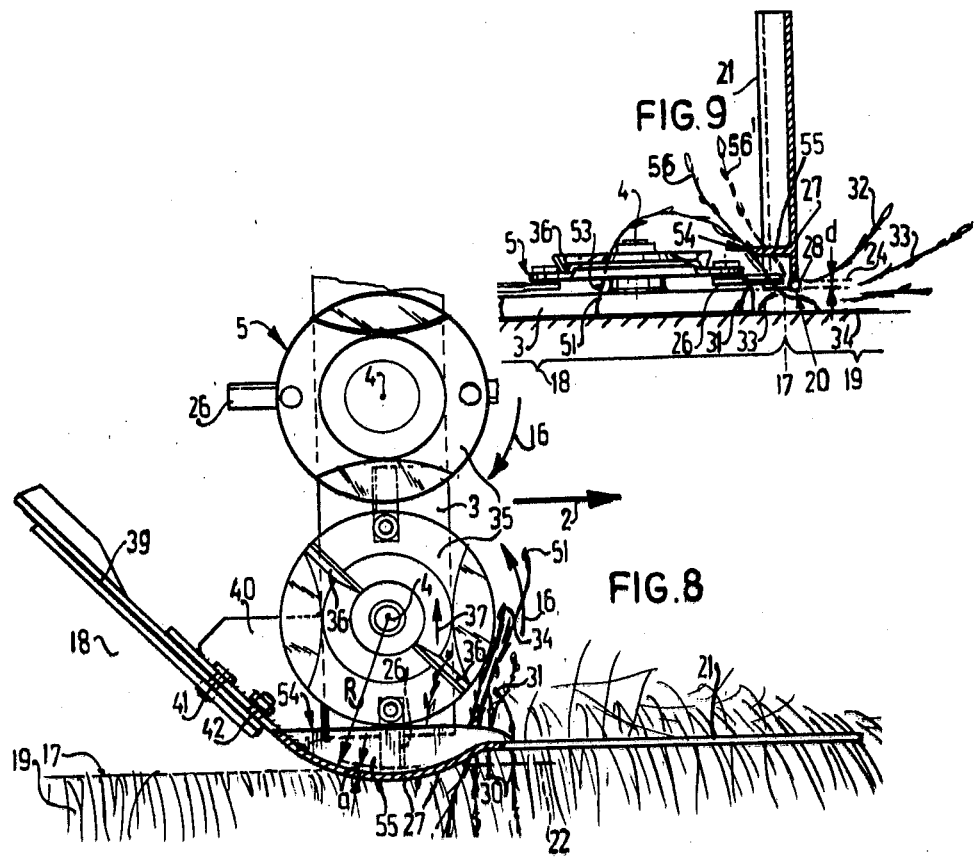

MOWING DEVICE

Mowing of fields with long-stemmed crop is usually performed by cutting parallel strips in sequence. Mowing of each strip is simplified, if a distinct separation between mown crop and the crop still to be cut is available.

The invention relates to a mowing device comprising a housing extending transversely of the direction of travel of the mowing device, a plurality of cutting members rotatable about upright shafts and journalled in said housing, a driving gear accommodated in said housing and driving the cutting members, supporting means having a supporting surface held on the ground for supporting the mowing device on the field and at least one screen arranged near one end of said housing and having a front portion disposed in front of the outermost cutting member, viewed in the direction of travel, and being located just inside the outermost path of said cutting member but at a higher level than said cutting member.

Such a mowing device is known. The lower rim of the screen thereof extends in one and the same vertical plane in the direction of travel of the mowing device, located just inside the outermost path of the outermost cutting member. With a known type of mowing device of the kind set forth the lower rim of the screen remains above the outermost cutting member. With a further known type of mowing device of the kind set forth the lower rim extends down to the supporting surface of the mowing device. With these two known types the demarcation between the strip of cut crop and the strip of crop still to be cut is not satisfactory. The crop still to be cut leans towards the strip already cut. This inclined crop may be caught by non-cutting parts of the mowing device and be torn instead of being cut, which requires much energy and results in a vague line of demarcation of non-cut crop. More often, however, the leaning crop is neither cut nor torn off so that an even less sharp line of separation between the strip cut and the strip to be cut results.

The invention has for its object to provide a possibility of cutting the crop more sharply up to the line of demarcation and of obtaining a more distinct line of demarcation between the cut crop and the crop still to be cut. For this purpose the lower rim of the screen near the outermost cutting member is disposed further outwardly than the front portion and outside the outermost cutting member, the lower rim of the screen being located at a higher level than the supporting surface, that is to say, approximately at the cutting level of the outermost cutting member.

The aforesaid and further features of the invention will be described more fully in the following description with reference to a drawing.

In the drawing:

FIG. 1 is a schematic, perspective view of a preferred embodiment of a mowing device in accordance with the invention, FIG. 2 is a schematic enlarged plan view of a detail II in FIG. 1, FIG. 3 is a schematic sectional view taken on the line III—III in FIG. 2, FIG. 4 is a side elevational view in the direction of the arrow IV in FIG. 2, FIG. 5 is a perspective view of a further preferred embodiment of a mowing device in accordance with the invention, FIG. 6 is a sectional view taken on the line VI—VI in FIG. 5, FIG. 7 is a perspective view of a detail of a further preferred embodiment of a mowing device in accordance with the invention, and FIGS. 8 and 9 are elevational views like FIGS. 2 and 3 of a further embodiment.

Each of the mowing devices 1 shown in FIGS. 1 to 7 comprises a housing 3 extending transversely of the intended direction of travel 2, a plurality of cutting members 5 rotatable about upright shafts 4 and journalled on the housing 3, driving gear means 6 accommodated in the housing 3 for driving the cutting members 5, supporting means 7 having a supporting surface 9 (see particularly FIG. 6) held on the field 8 for supporting the mowing device 1 on the ground 8 and a screen 11 arranged near the end 10 of the housing 3. The housing 3 is adapted to be coupled by means of a conventional auxiliary frame 13 with the three-point hitch 12 of a tractor (not shown), whilst the driving gear means 6 can be driven through a driving gear means 14 from the power take-off shaft 15 of the tractor, which is illustrated in FIGS. 1 and 5.

The cutting members 5 will rotate pairwise in opposite senses indicated by the arrows 16 at a high speed. The object of the invention is to provide a sharp line of demarcation 17 between the cut strip of crop 18 and the strip of crop 19 not yet cut, particularly in the event the crop is lying flat due to rain and/or wind and is lying across the line of demarcation 17 to be made. For this purpose the screen 11 is provided adjacent its lower edge portion, with a lower rim 20, which is disposed near the outermost cutting member 5 i.e. near the cutting member 5 furthest remote from the hitch 12 further outwardly than a front portion 21 of the screen 11, which is located just inside the outermost path 22 of said outermost cutting member 5, but at a higher level than this cutting member 5. The front portion 21 extends in the direction of travel 2 of the mowing device 1; it has the shape of a nose and has a lower rim 23, a portion of which is at an acute angle $y$ of, for example, 18° to the mowing level 24 of the cutting members 5 and which rim 23 smoothly merges with the lower rim 20 as indicated at 25 in FIG. 4. The lower rim 20 is located outside the path of the outermost cutting member 5 and is curved so as to be disposed at a distance $a$ of about 1 cm from the mowing cutters 26 around the latter, the radius of curvature R having its centre on the shaft 4 of the outermost cutting member 5. The lower rim 20 is higher by distance $h$ than the supporting surface 9, that is to say it is approximately at the cutting level 24 of the outermost cutting member 5. The lower rim 20 preferably extends, for example, a small distance $d$ of 1 to 2 cms below the cutting level 24.

The screen 11 is mainly formed by a flat plate, whose portion 27 that supports the lower rim 20 bulges outwardly (see FIG. 2). The lower rims 20 and 23 preferably have a rounded-off profile to ensure a ready passage of the crop, the profiles being, for example, formed by a round, welded, uninterrupted bar 28 (FIG. 3) or a bead rim 29 (FIG. 7).

FIG. 3 shows that a stalk 30 growing in the strip 19 and leaning across the line of demarcation 17 is cut off at the normal cutting level $f$. A stalk 31 growing inside the strip 18 and leaning across the line of demarcation 17 is also cut off at the cutting level f, but the top 32 is left on the strip 19 without causing any trouble. A stalk 33 just growing on the strip 18, but leaning almost completely across the strip 19 is cut only in the strip 19, but it does not disturb the line of demarcation 17 either in the non-cut state or in the cut state. A stalk 34 growing far inside the strip 19, but leaning across the line of demarcation 17 is urged by the front portion 21 of the screen 11 into the range of the cutters 26 and it is cut at the line of demarcation 17. After the passage of the mowing device 1 this stalk 34 will re-erect and be again cut during the cutting of the strip 19 so that the top of the stalk 34 remains on the strip 18 and the cut central portion on the strip 19. The line of demarcation 17 is not disturbed by the stalk 34.

The stalk 51, growing very far inside the strip 18 and lying across the line of demarcation 17, is cut at the cutting level 24 at point 52 and subsequently it is cut at point 53 because the stalk 51 is pushed downwards by the lower rim 20 and thus into the range of the cutters 26. The central portion of the stalk 51 then arrives at a distance from the line of demarcation 17 at the strip 18, whereas the top of the stalk 51 remains on the non-cut crop of the strip 19.

The present invention is particularly important for a mowing device 1 as shown in FIG. 1, in which each cutting member 5 is mainly formed by a disc 35 having two projecting cutters 26, said disc 35 being journalled directly above the housing 3 in the form of a flat beam. The cutters 26 of neighbouring cutting members 5 are relatively off-set. Only the outermost cutting member 5 of FIGS. 1 to 4 is preferably provided with two diametrically opposite blades 36, which are inclined rearwardly and upwardly, viewed in the direction of rotation 16 and which advance the cut crop in the direction of the arrow 37 away from the line of demarcation 17 in order to obtain at the side of the line of demarcation 17 a free path 38 (FIG. 1) for a tractor wheel. For the same purpose a console 40 of the end 10 of the housing 3 is provided with a swath board 39, which is pivotable about a pin 41 so that it can slide along the ground 8. A further pin 42 of the swath board 39 has a stop in an elongated hole 43 so that when the mowing device 1 is lifted, the swath board 39 is also lifted.

The supporting means 7 are formed as shown in FIGS. 1 to 4, by the bottom of the housing 3, but as shown in FIGS. 5 and 6 they may be formed by a separate skid 44, arranged on the housing 3.

The mowing device 1 shown in FIGS. 5 and 6 does not comprise blades 36 and differs otherwise from that shown in FIGS. 1 to 4 in that above the cutting members 5 there is journalled a substantially horizontal rotor 45, whose catches 46 convey the cut crop in the direction of the arrow 47 to the rear. For this purpose the rotor 45 is driven in the direction of the arrow 48 from the driving gear 14. The rotor 45 is journalled in the screen 11 described with reference to FIGS. 1 to 4 and in a lateral partition 49.

The mowing device 1 shown in FIG. 7 comprises cutting members 5, each of which is secured to a drum 50, which is journalled by its top end in the housing 3. The supporting means 7 of this mowing device 1 are formed by dishes arranged beneath the cutting members 5.

In each of the mowing devices 1 shown in accordance with the invention the lower rim 20 of the screen 11 remains at a higher level than the supporting surface 9 of the mowing device 1 so that the stalks to be cut and the portions cut off will not be jammed between the lower rim 20 and the ground 8 and will readily slide along the lower rim 20 while lightly touching the same.

FIGS. 8 and 9 differ from FIGS. 2 and 3 in that above the outermost path of the outermost cutting member 5 there is provided a substantially horizontal, additional depressing rim 54 urging the crop downwards and being secured to the screen 11, said rim 54 extending inwardly further than the front portion 21 and being formced by the rim of a horizontal plate 55 welded in the curved portion 27. The depressing rim 54 bends given stalks 56' indicated by broken lines, which may be left between the lower rim 20 and the cutter 26, into the bent position 56 indicated by solid lines, where cutting is ensured.

What we claim is:

1. A mowing device comprising a housing extending transversely of the direction of travel of the mowing device, a plurality of upright shafts journalled in said housing, driving gear means accommodated in said housing and driving the shafts, a plurality of cutting members, one fixed to the upper end of each shaft, supporting means having a supporting surface bearing on the ground for supporting the mowing device on the field so that the outermost cutting member at one end of the housing is disposed a predetermined distance above the ground to define a cutting level thereat, and at least one screen attached to said one end of the housing and having a front portion extending in front of the outermost cutting member, viewed in the direction of travel and being located just inside the outermost path of said outermost cutting member, but at a higher level than said outermost cutting member, said screen having a lower rim near the outermost cutting member, which extends further outwardly than the front portion and is disposed outside of the outermost cutting member, the lower rim of the screen being located at a higher level than the supporting surface approximately at said predetermined distance above the ground.

2. A mowing device as claimed in claim 1, characterized in that the lower rim is curved around the outermost cutting member.

3. A mowing device as claimed in claim 2, characterized in that the lower rim has a radius of curvature, the centre of which is located on the rotary axis of the outermost cutting member.

4. A mowing device as claimed in claim 1, characterized in that the screen is mainly formed by a plate whose lower rim bulges outwardly at the area of the outermost cutting member.

5. A mowing device as claimed in claim 1, characterized in that the lower rim has a rounded-off profile.

6. A mowing device as claimed in claim 1, characterized in that the lower rim extends slightly below the cutting level of the outermost cutting member.

7. A mowing device as claimed in claim 6, characterized in that the lower rim extends over a depth of about 1 to 2 cms below the cutting level of the outermost cutting member.

8. A mowing device as claimed in claim 1, characterized in that above the outermost path of the outermost cutting member a substantially horizontal additional depressing rim pressing down the crop is fastened to the screen.

9. A mowing device as claimed in claim 8, characterized in that the additional depressing rim extends further inwardly than the front portion.

10. A mowing device as claimed in claim 1, characterized in that the outermost cutting member mainly comprises a disc having at least one cutter projecting out of the disc and at least one crop directing blade arranged on the disc.

11. A mowing device as claimed in claim 2, characterized in that the screen is mainly formed by a plate whose lower rim bulges outwardly at the area of the outermost cutting member.

12. A mowing device as claimed in claim 3 characterized in that the screen is mainly formed by a plate whose lower rim bulges outwardly at the area of the outermost cutting member.

13. A mowing device as claimed in claim 2 characterized in that the lower rim has a rounded-off profile.

14. A mowing device as claimed in claim 3 characterized in that the lower rim has a rounded-off profile.

15. A mowing device as claimed in claim 4 characterized in that the lower rim has a rounded-off profile.

16. A mowing device as claimed in claim 2 characterized in that the lower rim extends slightly below the cutting level of the outermost cutting member.

17. A mowing device as claimed in claim 3 characterized in that the lower rim extends slightly below the cutting level of the outermost cutting member.

18. A mowing device as claimed in claim 4 characterized in that the lower rim extends slightly below the cutting level of the outermost cutting member.

19. A mowing device as claimed in claim 5 characterized in that the lower rim extends slightly below the cutting level of the outermost cutting member.

20. A mowing device as claimed in claim 2 characterized in that above the outermost path of the outermost cutting member a substantially horizontal additional depressing rim pressing down the crop is fastened to the screen.

21. A mowing device as claimed in claim 3 characterized in that above the outermost path of the outermost cutting member a substantially horizontal additional depressing rim pressing down the crop is fastened to the screen.

22. A mowing device as claimed in claim 4 characterized in that above the outermost path of the outermost cutting member a substantially horizontal additional depressing rim pressing down the crop is fastened to the screen.

23. A mowing device as claimed in claim 5 characterized in that above the outermost path of the outermost cutting member a substantially horizontal additional depressing rim pressing down the crop is fastened to the screen.

24. A mowing device as claimed in claim 6 characterized in that above the outermost path of the outermost cutting member a substantially horizontal additional depressing rim pressing down the crop is fastened to the screen.

25. A mowing device as claimed in claim 7 characterized in that aobve the outermost path of the outermost cutting member a substantially horizontal additional depressing rim pressing down the crop is fastened to the screen.

26. In a mowing device of the type including an elongate housing having means for attachment to a powered vehicle such that said housing extends transversely with respect to the path of travel of the vehicle, a plurality of upright shafts journalled in said housing and including one shaft disposed closely adjacent one end of said housing, drive means for simultaneously rotating said shafts, cutter means fixed to the upper ends of said shafts and including a cutter member fixed to the upper end of said one shaft and projecting radially therefrom to sweep a circular cutting path which extends beyond said one end of the housing whereby to delineate one side of a swath cut by the mowing device, the combination of:

means attached to said one end of the housing for causing said one side of the swath to be clearly delineated and support mechanism on said housing maintaining said cutting path at a predetermined level above the ground surface, said means comprising a screen having a front portion projecting forwardly of said housing and a rear portion substantially aligned with said one end of the housing, said front portion defining a lower edge which slopes upwardly and forwardly from approximately said predetermined level and said rear portion defining a lower edge disposed substantially at said predetermined level, said front portion extending parallel to said path of travel of the vehicle with said lower edge thereof offset inwardly from the outermost extent of said cutting path of said cutting member, and said rear portion bulging outwardly from said front portion with said lower edge edge thereof spaced slightly beyond said cutting path.

* * * * *